US009268740B2

(12) United States Patent
Ogata et al.

(10) Patent No.: US 9,268,740 B2
(45) Date of Patent: Feb. 23, 2016

(54) EXTERNAL ENVIRONMENT RECOGNIZING DEVICE FOR VEHICLE AND LIGHT DISTRIBUTION CONTROL SYSTEM USING THE SAME

(75) Inventors: Takehito Ogata, Hitachi (JP); Yuji Otsuka, Hitachinaka (JP); Shinya Ohtsuji, Naka-gun (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 147 days.

(21) Appl. No.: 13/813,037

(22) PCT Filed: Jul. 20, 2011

(86) PCT No.: PCT/JP2011/066399
§ 371 (c)(1),
(2), (4) Date: Jan. 29, 2013

(87) PCT Pub. No.: WO2012/014735
PCT Pub. Date: Feb. 2, 2012

(65) Prior Publication Data
US 2013/0131922 A1    May 23, 2013

(30) Foreign Application Priority Data

Jul. 30, 2010    (JP) ................................. 2010-171302

(51) Int. Cl.
*G06F 7/00*        (2006.01)
*G06F 17/00*       (2006.01)
(Continued)

(52) U.S. Cl.
CPC .............. *G06F 17/00* (2013.01); *B60Q 1/143* (2013.01); *G06K 9/00818* (2013.01);
(Continued)

(58) Field of Classification Search
USPC .................... 701/37; 340/933, 935, 937, 939
See application file for complete search history.

(56) References Cited

U.S. PATENT DOCUMENTS 6,343,869 B1 *   2/2002   Kobayashi ...................... 362/37
8,254,632 B2 *   8/2012   Heinrich et al. ............... 382/103
(Continued)

FOREIGN PATENT DOCUMENTS

JP          06-276524        9/1994
JP          2008-070999 A    9/1994
(Continued)

OTHER PUBLICATIONS

International Search Report, PCT/JP2011/066399, mailed Oct. 18, 2011, 5 pages.

*Primary Examiner* — John R Olszewski
*Assistant Examiner* — James M McPherson
(74) *Attorney, Agent, or Firm* — Foley & Lardner LLP

(57) ABSTRACT

An external environment recognizing device for vehicle includes an image acquiring unit configured to acquire image obtained by picking up image of an area ahead of an own vehicle, a light-source extracting unit configured to extract light source from the acquired image, an own-vehicle-speed acquiring unit configured to acquire own vehicle speed, an oncoming-vehicle-presence-possible-region estimating unit configured to estimate oncoming vehicle presence possible region on the basis of own vehicle speed, and an oncoming-vehicle detecting unit configured to detect an oncoming vehicle on the basis of the oncoming vehicle presence possible region and the light source. The oncoming-vehicle-presence-possible-region estimating unit estimates oncoming vehicle presence possible region on the basis of the own vehicle speed, a minimum curvature radius of traveling road corresponding to a speed limit determined in advance, and traffic information indicating whether driving on the traveling road is driving on the right side or the left side.

16 Claims, 10 Drawing Sheets

(51) Int. Cl.
   *B60Q 1/14* (2006.01)
   *G08G 1/16* (2006.01)
   *G06K 9/00* (2006.01)
   *G06K 9/32* (2006.01)

(52) U.S. Cl.
   CPC ......... *G08G 1/165* (2013.01); *B60Q 2300/056* (2013.01); *B60Q 2300/41* (2013.01); *B60Q 2300/42* (2013.01); *G06K 9/00805* (2013.01); *G06K 9/00825* (2013.01); *G06K 9/3233* (2013.01); *G08G 1/166* (2013.01)

(56) References Cited

U.S. PATENT DOCUMENTS

| | | |
|---|---|---|
| 2008/0024325 A1 | 1/2008 | Kobayashi et al. |
| 2008/0030374 A1 | 2/2008 | Kumon et al. |
| 2009/0010494 A1* | 1/2009 | Bechtel et al. ............ 382/104 |
| 2010/0091513 A1 | 4/2010 | Kamioka |
| 2010/0134011 A1* | 6/2010 | Kobayashi ............ 315/82 |
| 2010/0253541 A1* | 10/2010 | Seder et al. ............ 340/905 |
| 2010/0295705 A1* | 11/2010 | Walter et al. ............ 340/937 |

FOREIGN PATENT DOCUMENTS

| | | |
|---|---|---|
| JP | 6274626 | 9/1994 |
| JP | 6276524 | 9/1994 |
| JP | 2005-128790 A | 5/2005 |
| JP | 2008-033676 | 2/2008 |
| JP | 2008-033676 A | 2/2008 |
| JP | 2008-040615 A | 2/2008 |
| JP | 2009-096249 A | 5/2009 |
| JP | 2009-157668 A | 7/2009 |
| JP | 2010-092422 A | 4/2010 |
| JP | 2010-111260 A | 5/2010 |
| JP | 2010-151692 A | 7/2010 |
| WO | WO2009/052788 * | 4/2009 |

* cited by examiner

| DESIGN SPEED [km/h] | CURVE RADIUS [m] |
|---|---|
| 120 | 570 |
| 100 | 380 |
| 80 | 230 |
| 60 | 120 |
| 50 | 80 |
| 40 | 50 |
| 30 | 30 |
| 20 | 15 |

(a) 30 [km/h] CASE (b) 60 [km/h] CASE (c) 90 [km/h] CASE (a) 30 [km/h] CASE (b) 60 [km/h] CASE (c) 90 [km/h] CASE

# EXTERNAL ENVIRONMENT RECOGNIZING DEVICE FOR VEHICLE AND LIGHT DISTRIBUTION CONTROL SYSTEM USING THE SAME

TECHNICAL FIELD

The present invention relates an external environment recognizing device for vehicle that detects a preceding vehicle and an oncoming vehicle using an image pickup device such as a camera and a light distribution control system using the external environment recognizing device for vehicle.

BACKGROUND ART

Since a driver of an automobile has a narrow view at night, a risk of traffic accident occurrence is high and, when a traffic accident occurs, a death rate is high. Therefore, the development of a light distribution control system is underway. The light distribution control system divides an irradiation range of headlights of an own vehicle into a plurality of small regions and adjusts the intensity and the height of beams in the respective regions to thereby prevent drivers of other vehicles from being dazzled while increasing visibility for the driver at night. As a method of detecting a preceding vehicle and an oncoming vehicle at night, for example, there is a method of extracting, using, for example, a vehicle-mounted camera, headlights of the oncoming vehicle and taillights of the preceding vehicle out of points of white light and points of red light reflected in an image.

However, light sources such as streetlights and reflected lights of reflectors are present on a road besides lights of other vehicles. All the light sources are reflected in a camera image as points of light. Therefore, it is necessary to identify light sources of the other vehicles and light sources other than the light sources of the other vehicles out of the light sources. In particular, the reflected lights of the reflectors present on the road tend to be misrecognized as headlights of oncoming vehicles.

In order to prevent the reflected lights of the reflectors from being misrecognized as headlights of oncoming vehicles, for example, PTL 1 describes a method of recognizing a white line and determining that light on the recognized white line is not a headlight of an oncoming vehicle.

PTL 2 describes a method of changing a signal processing range of a radar according to road information acquired from a navigation system.

CITATION LIST

Patent Literature

PTL 1: JP-A-2008-33676
PTL 2: JP-A-2008-70999

SUMMARY OF INVENTION

Technical Problem

However, in the methods explained above, misdetection cannot be eliminated on a road where a recognition result of the white line and information of the navigation system are not obtained.

In the method described in PTL 1, misdetection of a reflector cannot be eliminated on a road where the white line is absent.

In a method obtained by combining PTL 2 and PTL 1, misdetection cannot be eliminated when positional deviation of the navigation system occurs or while a vehicle is traveling on a road not covered by the navigation system such as a newly-constructed road.

The present invention has been devised in view of the above points and it is an object of the present invention to provide an external environment recognizing device for vehicle that can prevent, for example, reflected light of a reflector from being misrecognized as a headlight of an oncoming vehicle even on a road where a white line and information of a navigation system is not obtained and a light distribution control system using the external environment recognizing device for vehicle.

Solution to Problem

In order to solve the problems, the present invention provides an external environment recognizing device for vehicle including: an image acquiring unit configured to acquire an image obtained by picking up an image of an area ahead of an own vehicle; a light-source extracting unit configured to extract a light source from the acquired image; an own-vehicle-speed acquiring unit configured to acquire own vehicle speed; an oncoming-vehicle-presence-possible-region setting unit configured to estimate an oncoming vehicle presence possible region on the basis of the own vehicle speed; and an oncoming-vehicle detecting unit configured to detect an oncoming vehicle on the basis of the oncoming vehicle presence possible region and the light source. The oncoming-vehicle-presence-possible-region setting unit estimates the oncoming vehicle presence possible region on the basis of the own vehicle speed, a minimum curvature radius of a traveling road corresponding to a speed limit determined in advance, and traffic information indicating whether driving on the traveling road is driving on the right side or driving on the left side.

The present invention provides a light distribution control system including: an external environment recognizing device for vehicle including an image acquiring unit configured to acquire an image obtained by picking up an image of an area ahead of an own vehicle, a light-source extracting unit configured to extract a light source from the acquired image, an own-vehicle-speed acquiring unit configured to acquire own vehicle speed, an oncoming-vehicle-presence-possible-region setting unit configured to estimate an oncoming vehicle presence possible region on the basis of the own vehicle speed, and an oncoming-vehicle detecting unit configured to detect an oncoming vehicle on the basis of the oncoming vehicle presence possible region and the light source and output information concerning the oncoming vehicle; and a light distribution control device including a beam control unit configured to control irradiation intensity of a headlight. The external environment recognizing device for vehicle includes an oncoming-vehicle-information transmitting unit configured to transmit information concerning the oncoming vehicle output from the oncoming-vehicle detecting unit to the light distribution control device. The oncoming-vehicle-presence-possible-region setting unit estimates the oncoming vehicle presence possible region on the basis of the own vehicle speed, a minimum curvature radius of a traveling road corresponding to a speed limit determined in advance, and traffic information indicating whether driving on the traveling road is driving on the right side or driving on the left side.

Advantageous Effect of Invention

It is possible to provide an external environment recognizing device for vehicle that can prevent, for example, reflected light of a reflector from being misrecognized as an oncoming vehicle even on a road where a white line and information of a navigation system is not obtained and a light distribution control system using the external environment recognizing device for vehicle. This specification incorporates contents described in the specification and/or the drawings of Japanese Patent Application No. 2010-171302, which is the basis of the priority of this application.

DESCRIPTION OF EMBODIMENTS

Figure 1:
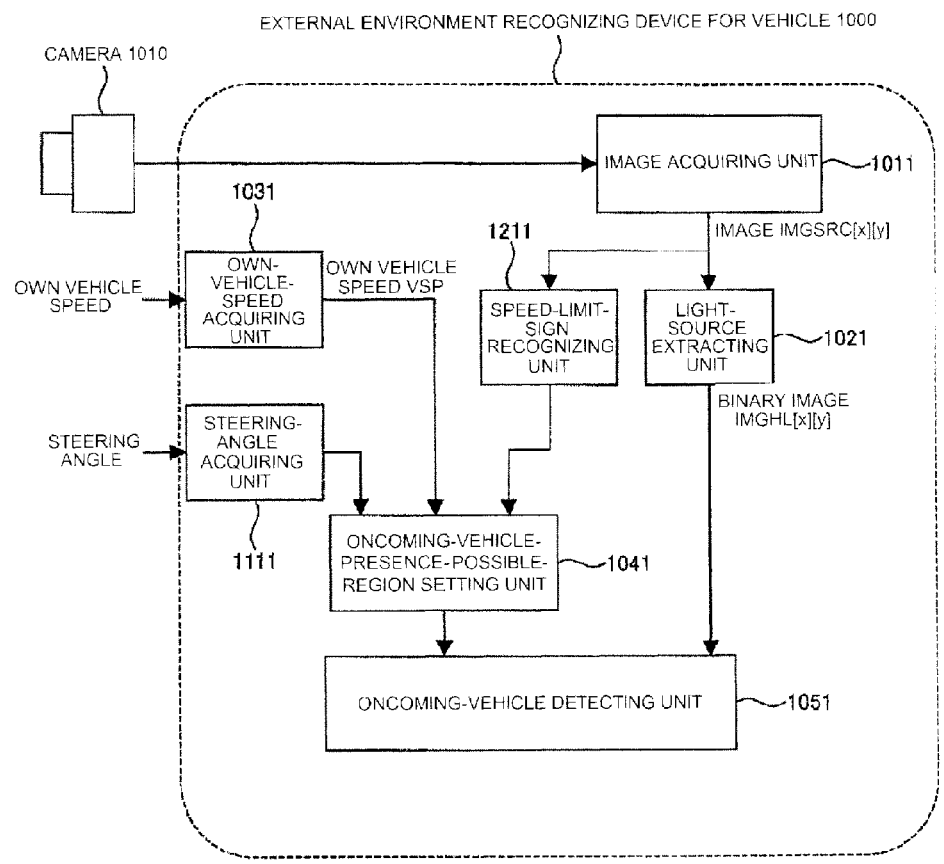
FIG. 1 is a block diagram showing an embodiment of an external environment recognizing device for vehicle according to the present invention.

FIG. 1 is a block diagram of an external environment recognizing device for vehicle 1000 according to the present invention.

The external environment recognizing device for vehicle 1000 is incorporated, for example, in a camera 1010 mounted on an automobile or in an integrated controller and used to recognize an environment around the own vehicle from an image photographed by the camera 1010. In this embodiment, the external environment recognizing device for vehicle 1000 is configured to detect an oncoming vehicle and a preceding vehicle from an image obtained by picking up an image of an area ahead of the own vehicle.

The external environment recognizing device for vehicle 1000 is configured by a computer including a CPU, a memory, and an I/O. The external environment recognizing device for vehicle 1000 is programmed with predetermined processing to repeatedly execute processing at a period set in advance.

The external environment recognizing device for vehicle 1000 includes, as shown in FIG. 1, an image acquiring unit 1011, a light-source extracting unit 1021, an own-vehicle-speed acquiring unit 1031, an oncoming-vehicle-presence-possible-region setting unit 1041, and an oncoming-vehicle detecting unit 1051. Further, depending on an embodiment, the external environment recognizing device for vehicle 1000 includes a steering-angle acquiring unit 1111 and a speed-limit-sign recognizing unit 1211.

The image acquiring unit 1011 captures, from the camera 1010 attached to a position where an image of an area ahead of the own vehicle can be picked up, data obtained by photographing an area ahead of the own vehicle and writes the data on a RAM as an image IMGSRC[x][y]. The image IMGSRC[x][y] is a two-dimensional array and x and y respectively indicate coordinates of the image.

The light-source extracting unit 1021 calculates, from the image IMGSRC[x][y], a light point P_HL[i], which is a candidate of a headlight. In P_HL[i], i is an ID number affixed when a plurality of objects are detected. The light point P_HL[i] has a position on an image and an area as elements. The position on the image of the light point P_HL[i] is represented as P_HL[i].X and P_HL[i].Y and the area is represented as P_HL[i].A. Details of processing are explained below.

The own-vehicle-speed acquiring unit 1031 acquires a signal of a vehicle speed sensor mounted on the own vehicle and obtains own vehicle speed VSP. The signal of the vehicle speed sensor may be acquired by being directly input to the external environment recognizing device for vehicle 1000 or may be acquired by performing communication using a LAN (Local Area Network) or a CAN (Controller Area Network).

The oncoming-vehicle-presence-possible-region setting unit 1041 calculates, according to the own vehicle speed VSP, a minimum turning radius R_MIN on a traveling road of the own vehicle and calculates a range in which an oncoming vehicle is possibly present. Details of processing are explained below.

The oncoming-vehicle detecting unit 1051 determines, according to the range in which an oncoming vehicle is possibly present, whether the calculated light point P_HL[i] is an oncoming vehicle. Details of processing are explained below.

A position of headlights of the extracted oncoming vehicle on the image is converted into an angle in the lateral direction, which is the direction of the oncoming vehicle viewed from the own vehicle, and output from the camera. The output may be performed by being directly input or may be performed through communication using a LAN (Local Area Network) or a CAN (Controller Area Network). The output may be a position coordinate itself of the oncoming vehicle on the image or may be a world coordinate calculated from the image using a camera geometric parameter.

The steering-angle acquiring unit 1111 acquires a signal of a steering angle sensor mounted on the own vehicle and obtains a steering angle STR of the own vehicle. The signal of the own steering angle sensor may be acquired by being directly input to the external environment recognizing device for vehicle 1000 or may be acquired by performing communication using a LAN (Local Area Network) or a CAN (Controller Area Network).

The speed-limit-sign recognizing unit 1211 recognizes, from the image IMGSRC[x][y], a sign of a speed limit on a road on which the own vehicle is traveling. Details of processing are explained below.

In the oncoming-vehicle-presence-possible-region setting unit 1041, a regulation of a minimum radius in a curve of a road corresponding to a speed limit and a regulation concerning a traffic direction of the road are used. In this embodiment, the regulations in the case of Japan are explained.

Figure 2:
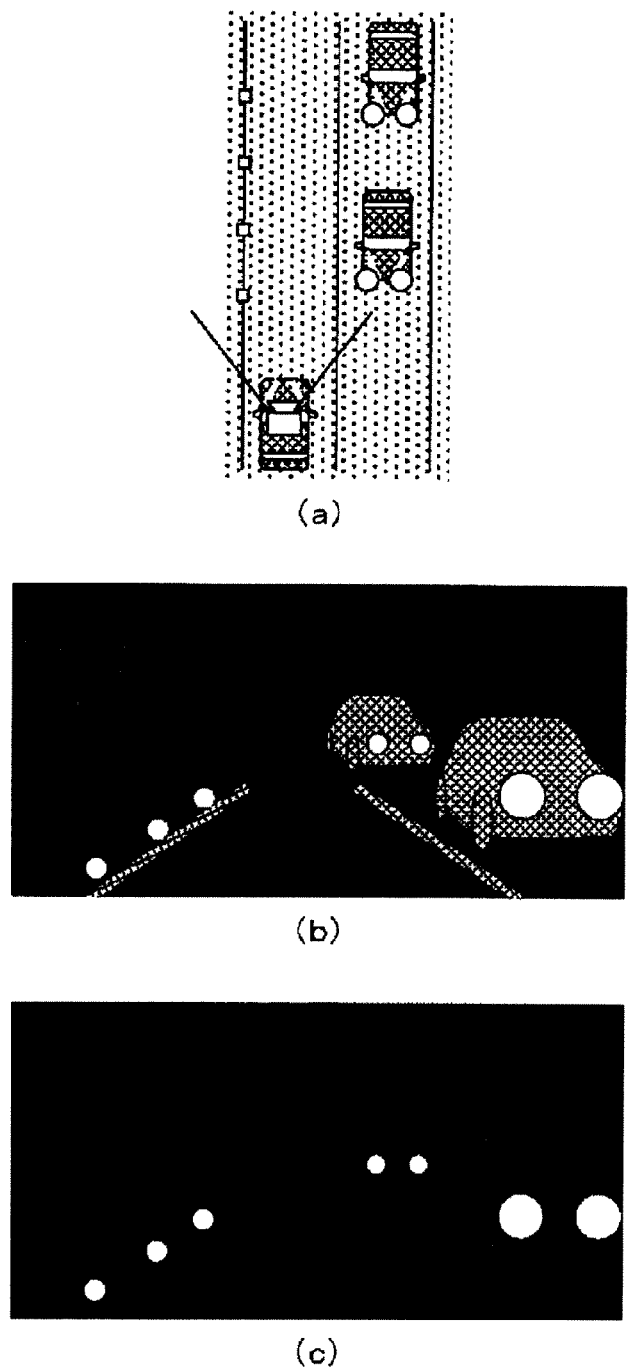
FIG. 2 is a schematic diagram showing a processing example in a light-source extracting unit of the external environment recognizing device for vehicle shown in 1.

First, contents of processing in the light-source extracting unit 1021 are explained with reference to FIG. 2. FIG. 2 shows an example of the processing in the light-source extracting unit 1021.

The light-source extracting unit 1021 calculates, from the image IMGSRC[x] [y], the light point P_HL[i], which is possibly a headlight of an oncoming vehicle, according to predetermined processing.

When a camera image is acquired in a dark environment as shown in FIG. 2(*a*), as shown in FIG. 2(*b*), light sources such as headlights of oncoming vehicles are reflected bright and portions other than the light sources are reflected dark. Therefore, an image IMGHL[x] [y] having the same size as the image IMGSRC[x] [y] is prepared. If a luminance value of a pixel (x, y) of the image IMGSRC[x] [y] is equal to or larger than a predetermined thresholds Th_HL, "1" is input and, otherwise, "0" is input to the same pixel of the image IMGHL [x] [y], whereby a binary image IMGHL[x] [y] obtained by extracting a headlight candidate in the image is generated.

The threshold Th_HL is a value adjusted such that a headlight of a vehicle desired to be detected can be extracted. The threshold Th_HL is determined by photographing lights of various vehicles using the camera. Alternatively, the threshold Th_HL may be manually set experimentally. The threshold Th_HL may be a variable value and may be changed according to a period of time or brightness of the environment or changed according to a position on an image.

FIG. 2(*c*) is an example in which the binary image IMGHL [x] [y] is extracted from FIG. 2(*b*). In this figure, white of the image represents "1" of the binary image and black represents "0".

The light point P_HL[i] is calculated by applying labeling processing to the binary image IMGHL[x] [y]. The labeling processing is a method of extracting, from the binary image IMGHL[x] [y], information concerning a region where a pixel value is "1". In this embodiment, each of regions where pixel values are "1" is set as the light point P_HL[i]. Gravity center positions X and Y and an area A of the light point P_HL[i] are calculated.

Processing for calculating the light point P_HL[i] from the image IMGSRC[x] [y] may be a method other than the method of generating the binary image IMGHL[x] [y] and extracting the light point P_HL[i] using the labeling processing. For example, the processing may be a method of registering a representative pattern of a headlight on an image in a database as a template, extracting a portion similar to the template, and setting the portion as the light point P_HL[i].

Figure 5:
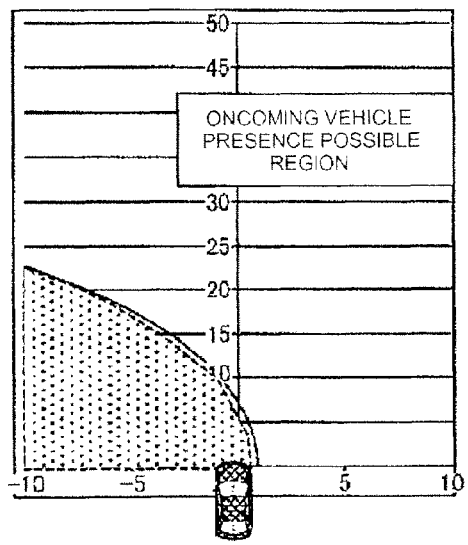
FIG. 5 is a schematic diagram showing an oncoming vehicle presence possible region of the external environment recognizing device for vehicle shown in FIG. 1.
Figure 5:
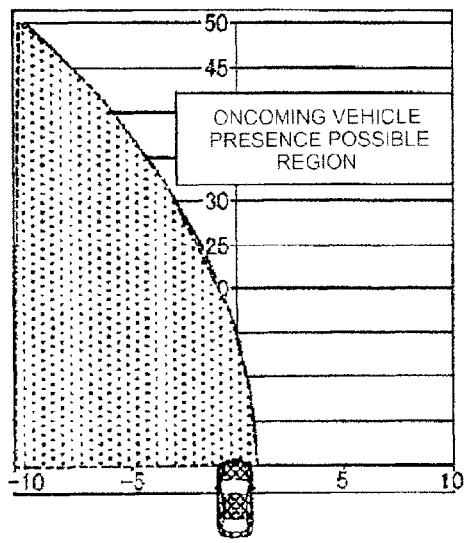
Figure 5:
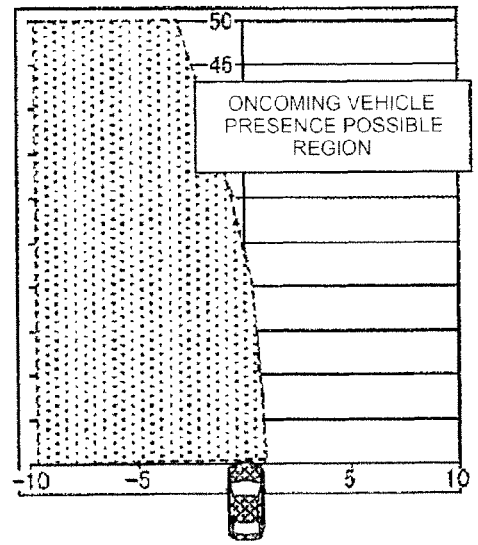

Contents of processing in the oncoming-vehicle-presence-possible-region setting unit 1041 are explained with reference to FIGS. 3, 4, and 5.

The oncoming-vehicle-presence-possible-region setting unit 1041 calculates, from the own vehicle speed VSP acquired by the own-vehicle-speed acquiring unit 1031, an estimated minimum turning radius R_MIN on a traveling road of the own vehicle and sets an oncoming vehicle presence possible region using the estimated minimum turning radius R_MIN.

Figures 3, 4:
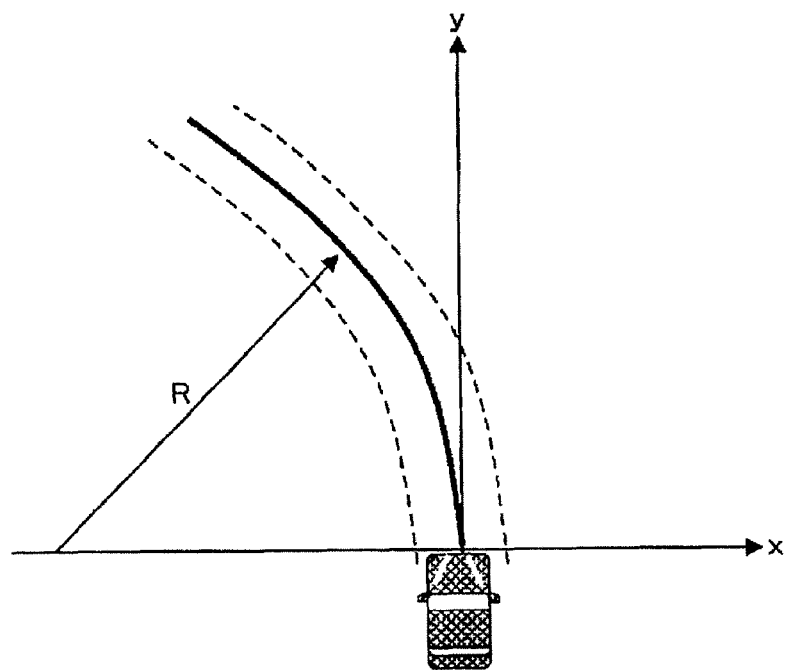
FIG. 3 is a schematic diagram showing processing in an oncoming vehicle presence possible region setting unit of the external environment recognizing device for vehicle shown in FIG. 1.
FIG. 4 is a diagram showing a turning radius corresponding to a speed limit used in an oncoming vehicle presence possible region setting unit of the external environment recognizing device for vehicle shown in FIG. 1.

As shown in FIG. 3, a curve of a road can be represented as a part of a circle having a radius R. The structure of the road is regulated by the law. In Japan, as shown in FIG. 4, minimum curvature radiuses of curves of roads are determined according to speed limits. Therefore, the minimum turning radius R_MIN of a curve of a road on which the own vehicle is currently traveling can be calculated from the own vehicle speed VSP. Considering that a driver is driving exceeding a speed limit, the minimum turning radius R_MIN may be calculated from a value obtained by multiplying the own vehicle speed VSP with a predetermined coefficient β (<1.0).

Subsequently, an oncoming vehicle presence possible region is set from the minimum turning radius R_MIN. On a left-side driving road as in Japan, as shown in FIG. 5, considering a world coordinate system in which a front end center of a vehicle is set as an origin, the lateral direction is set as an X axis, and the depth direction is set as a Y axis, when a circle of a left curve is drawn at a radius (R_MIN+0.5× vehicle width Wcar) from the right end of the own vehicle, a region on the inner side of the circle is a region where an oncoming vehicle is absent and a region other than the region is a region where an oncoming vehicle is possibly present. In FIG. 5, examples in (a) a 30 km per hour case, (b) a 60 km per hour case, and (c) a 90 km per hour case are shown.

The oncoming-vehicle-presence-possible-region setting unit 1041 estimates an oncoming vehicle presence possible region on the basis of the own vehicle speed VSP, a minimum curvature radius of a traveling road corresponding to a speed limit determined in advance, and traffic information indicating whether driving on the traveling road is driving on the right side or driving on the left side. More specifically, the oncoming-vehicle-presence-possible-region setting unit 1041 estimates the minimum turning radius R_MIN of the traveling road on the basis of the own vehicle speed VSP, a minimum curvature radius of a traveling road corresponding to a speed limit determined in advance, and traffic information indicating whether driving on the traveling road is driving on the right side or driving on the left side and estimates an oncoming vehicle presence possible region on the basis of the estimated minimum turning radius R_MIN.

Contents of processing in the oncoming-vehicle detecting unit 1051 are explained.

The oncoming-vehicle detecting unit 1051 determines whether points of the light point P_HL[i] shown in the binary image IMGHL[x] [y] output from the light-source extracting unit 1021 are light points of oncoming vehicles according to which of the region where an oncoming vehicle is possibly present and the region where an oncoming vehicle is absent in the world coordinate system having the vehicle front end center as the origin, which is calculated by the oncoming-vehicle-presence-possible-region setting unit 1041, the points belong to.

First, the oncoming-vehicle detecting unit 1051 calculates, from the positions P_HL[i].X and P_HL[i].Y of the light point P_HL[i] on the image and coordinates VPX and VPY of a vanishing point of the camera, a distance P_HL[i].PY and a lateral position P_HL[i].PX of the light point P_HL[i] in the world coordinate system having the vehicle front end center as the origin. In the calculation, it is assumed that there is no height of the light point P_HL[i] (=0). A camera geometric parameter calculated in advance by calibration or the like is used for conversion.

Subsequently, the oncoming-vehicle detecting unit 1051 extracts only light points, world coordinates P_HL[i].PY and P_HL[i].PX of which are included in the oncoming vehicle presence possible region, in the light point P_HL[i] and erases light points, world coordinates P_HL[i].PY and P_HL [i].PX of which are not included in the oncoming vehicle presence possible region from P_HL[i].

Further, the oncoming-vehicle detecting unit 1051 extracts light points forming pairs in the light point P_HL[i]. A method of extracting light points forming pairs is explained below.

First, the oncoming-vehicle detecting unit 1051 extracts all combinations (P_HL[i], P_HL[j]) of points, the Y coordinate P_HL[i].Y of which on the image is smaller than a predetermined threshold TH_Ypair, among all light points.

Subsequently, the oncoming-vehicle detecting unit 1051 calculates, concerning each of the combinations, differences in a distance of an X coordinate and an area according to the following expression.

$$DX[i][j]=ABS(P\_HL[i].X-P\_HL[j].X)$$

$$DA[i][j]=ABS(P\_HL[i].A-P\_HL[j].A)$$

where, ABS ( ) represents an absolute value.

Further, when DX[i] [j] and DA[i] [j] are smaller than predetermined thresholds TH_DXpair and TH_DApair, the oncoming-vehicle detecting unit 1051 decides that the two pairs are headlights of oncoming vehicles.

As explained above, the region where an oncoming vehicle is absent is set using the minimum turning radius R_MIN calculated according to the own vehicle speed VSP and a traffic rule indicating the driving on the left side. Light points, which are headlight candidates, are extracted out of various light points included in a camera image. It is determined according to positions of the light points whether the light points are light points of oncoming vehicles or noise. Misdetection in which a light point that is not an oncoming vehicle is determined as an oncoming vehicle is reduced. In this way, since the misdetection can be reduced according to only own vehicle speed, the processing is effective.

The oncoming-vehicle-presence-possible-region setting unit 1041 may take into account a yaw angle $\theta\_V$ of the own vehicle in addition to the minimum turning radius R_MIN. When a vehicle changes a lane, the vehicle tilts most with respect to a lane in which the vehicle is traveling. When the vehicle tilts most, it is possible that an oncoming vehicle is present in a direction tilting by the yaw angle $\theta\_V$ from the front of the own vehicle.

Therefore, an example in which the yaw angle $\theta\_V$ of the own vehicle is taken into account is explained below. In this example, since a configuration is the same as the configuration of the block diagram of FIG. 1, only another embodiment of the oncoming-vehicle-presence-possible-region setting unit 1041 is explained.

First, the oncoming-vehicle-presence-possible-region setting unit 1041 calculates a maximum yaw angle $\theta\_V$ of the own vehicle. Since lateral acceleration $\alpha X$ of a vehicle generated during a lane change is in a proportional relation with discomfort of a driver, in a normal lane change, the lateral acceleration $\alpha X$ of the vehicle is not a large value. Therefore, lateral accelerations during lane changes of a plurality of drivers are measured and a value larger than a maximum value of the lateral accelerations is set as maximum lateral acceleration $\alpha X\_MAX$.

Figure 6:
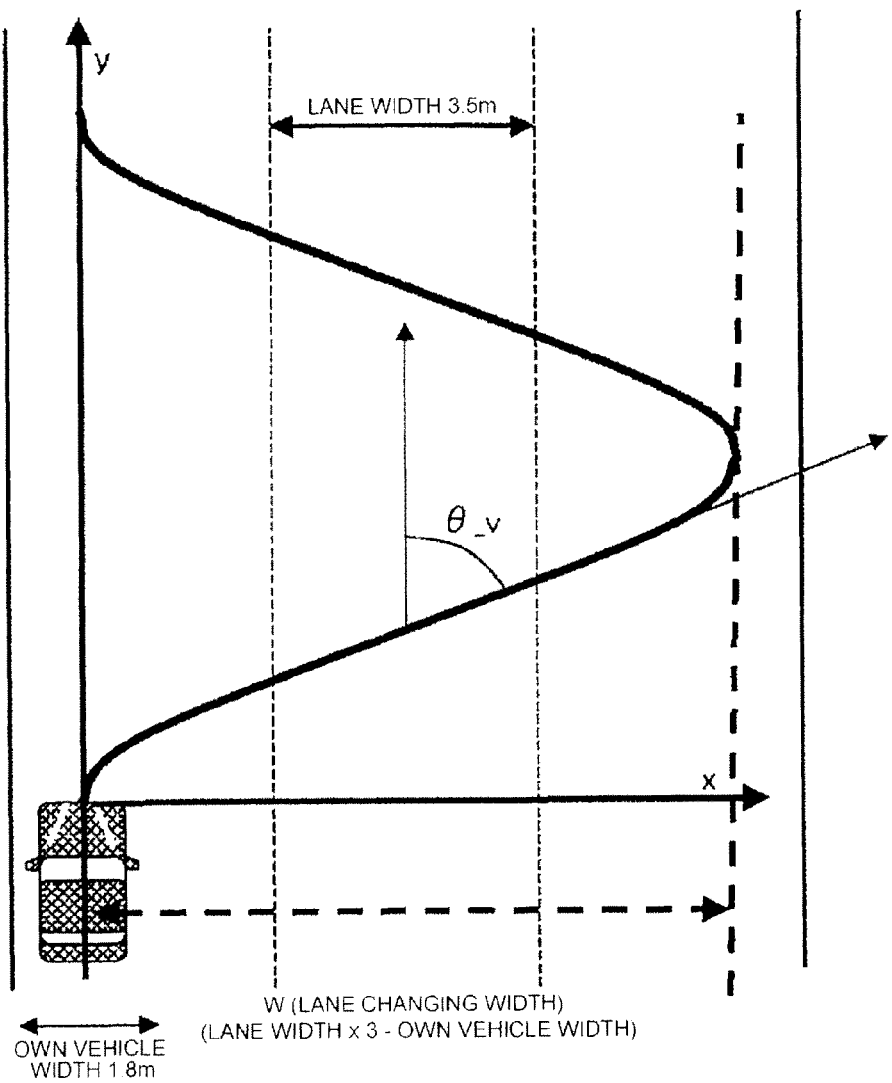
FIG. 6 is a schematic diagram showing a yaw angle calculation model during a lane change in an oncoming vehicle presence possible region setting unit of the external environment recognizing device for vehicle shown in FIG. 1.

As shown in FIG. 6, a track of the own vehicle in changing a lane at a distance of width W is approximated by a trigonometric function to give the vehicle speed VSP and the maximum lateral acceleration $\alpha X\_MAX$, whereby it is possible to calculate the maximum yaw angle $\theta\_V$ during the lane change on a road on which the own vehicle is currently traveling.

Subsequently, the oncoming-vehicle-presence-possible-region setting unit 1041 calculates an oncoming vehicle presence possible region taking into account the maximum yaw angle $\theta\_V$ of the own vehicle.

Figure 7:
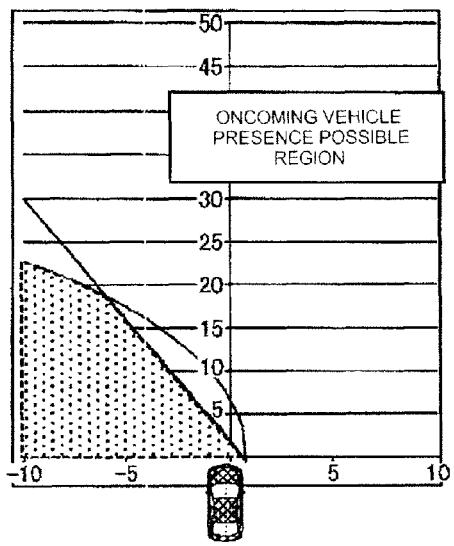
FIG. 7 is a schematic diagram showing the oncoming vehicle presence possible region of the external environment recognizing device for vehicle shown in FIG. 1.
Figure 7:
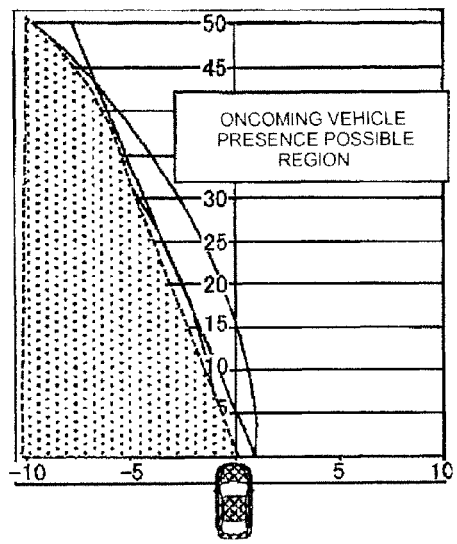
Figure 7:
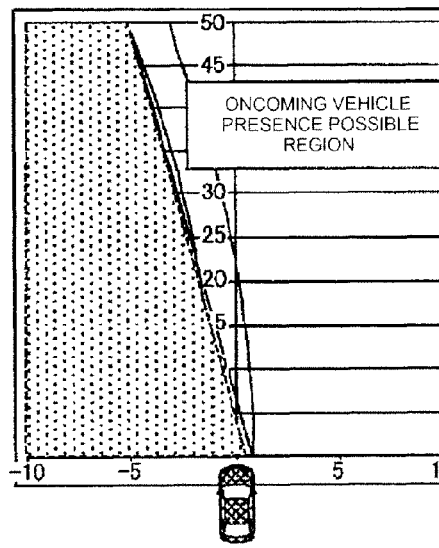

As shown in FIG. 7, considering a world coordinate system in which a front end center of a vehicle is set as an origin, the lateral direction is set as an X axis, and the depth direction is set as a Y axis, in a left-side driving road, when a circle of a left curve is drawn at a radius (R_MIN+0.5× vehicle width Wcar) from the right end of the own vehicle, a region on the inner side of the circle is a region where an oncoming vehicle is absent.

However, considering a lane change time, a vehicle is possibly present further on the right side than a line obtained by drawing a straight line tilting to the left side by a yaw angle from the right end of the own vehicle. Therefore, an AND region of the circle of the left curve drawn at the radius (R_MIN+0.5× vehicle width Wcar) from the right end of the own vehicle and a region on the left side of the straight tilting to the left side by the yaw angle from the right end of the own vehicle is a region where an oncoming vehicle is absent. A region other than the region is an oncoming vehicle presence possible region.

In FIG. 7, examples in (a) a 30 km per hour case, (b) a 60 km per hour case, and (c) a 90 km per hour case are shown.

Contents of processing in the oncoming-vehicle-presence-possible-region setting unit 1041 performed when the steering-angle acquiring unit 1111 is used are explained.

When the external environment recognizing device for vehicle 1000 includes the own-vehicle speed acquiring unit 1031 and the steering-angle acquiring unit 1111, the oncoming-vehicle-presence-possible-region setting unit 1041 calculates a turning radius Rv of the own vehicle from the steering angle STR and changes a turning radium of a predicted course according to a value of the turning radius Rv.

First, a method of calculating the turning radius Rv of the own vehicle is explained. As shown in FIG. 3, when an own vehicle position is set as an origin O, a predicted course can be approximated by an arc having the turning radius Rv that passes the origin O. The turning radius Rv is represented by Expression (1) using the steering angle STR, the speed VSP, a stability factor A, a wheelbase L, and a steering gear ratio Fs of the own vehicle.

Expression 1

$$Rv=(1+A\cdot VSP2)\times(L\cdot Gs/STR) \qquad (1)$$

Plus and minus of the stability factor control a steering characteristic of a vehicle. The stability factor is an important value that is an index indicating a magnitude of a change that depends on the speed of steady circle turning of the vehicle. As it is seen from Expression (1), the turning radius Rv changes in proportion to a square of the speed VSP of the own vehicle with the stability factor A set as a coefficient.

The turning radius Rv can also be calculated by Expression (2) using the vehicle speed VSP and a yaw rate $\gamma$.

Expression 2

$$Rv=VSP/\gamma \qquad (2)$$

The oncoming-vehicle-presence-possible-region setting unit 1041 calculates the turning radius Rv of the own vehicle using a method of Expression (1) or Expression (2).

Subsequently, the oncoming-vehicle-presence-possible-region setting unit 1041 calculates the estimated minimum turning radius R_MIN in a traveling road of the own vehicle according to the turning radius Rv of the own vehicle. For example, since driving on a road in Japan is driving on the left side, when the own vehicle is turning to the right, as shown in FIG. 8(a), it is considered that an oncoming vehicle is absent at least further on the left side than the left end of the own vehicle.

Figure 8:
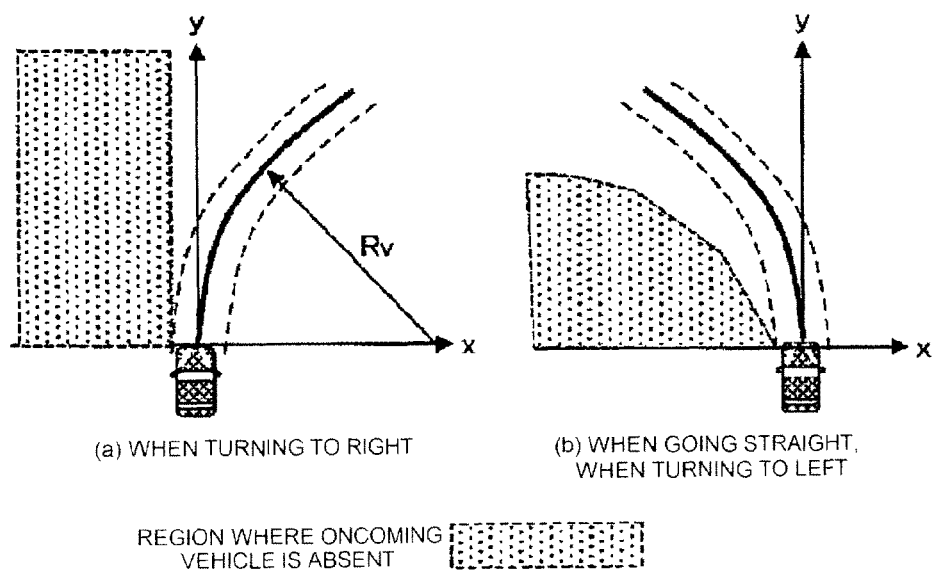
FIG. 8 is a schematic diagram showing a processing example of an oncoming vehicle presence possible region setting unit of the external environment recognizing device for vehicle shown in FIG. 1.

When the own vehicle is traveling straight or when the own vehicle is turning to the right, as shown in FIG. 8(b), since the structure of the road is determined, a minimum turning radius calculated by the road structure method explained above only has to be set. During the left turn, when the turning radius Rv of the own vehicle is smaller than the minimum turning radius calculated by the road structure method, the turning radius Rv of the own vehicle is adopted.

Contents of processing in the speed-limit-sign recognizing unit 1211 are explained.

First, the speed-limit-sign recognizing unit 1211 searches for a sign indicating a speed limit from the image IMGSRC[x] [y]. For the search, for example, color information of signs and information concerning setting locates are used. For example, in Japan, a speed limit is displayed in blue characters on a circular sign colored in red on the outer side and colored in white on the inner side. Setting height of the sign is regulated by the law. Therefore, the speed-limit-sign recognizing unit 1211 searches for, using a publicly-known technique such as template matching, a region that satisfies such a condition from the image IMGSRC[x] [y].

Subsequently, the speed-limit-sign recognizing unit 1211 recognizes a number of the speed limit from the found sign. For the recognition, a pattern recognition method such as a neural network or the like, which is a publicly-known technique, is used. The neural network is a pattern recognition method that simulates a model of the human brain. In the neural network, learning is necessary beforehand. The learning is performed according to an algorithm called back propagation method using a teacher data set, which is a set of images of signs in various situations and speed limits drawn on the signs. Since the pattern recognition method by the neural network is a publicly-known technique, details are not explained in the present invention.

An embodiment of the light distribution control system 4000 in which an external environment recognizing device for vehicle 2000 and a light distribution control device 3000 according to the present invention are used is explained below with reference to the drawings.

Figure 9:
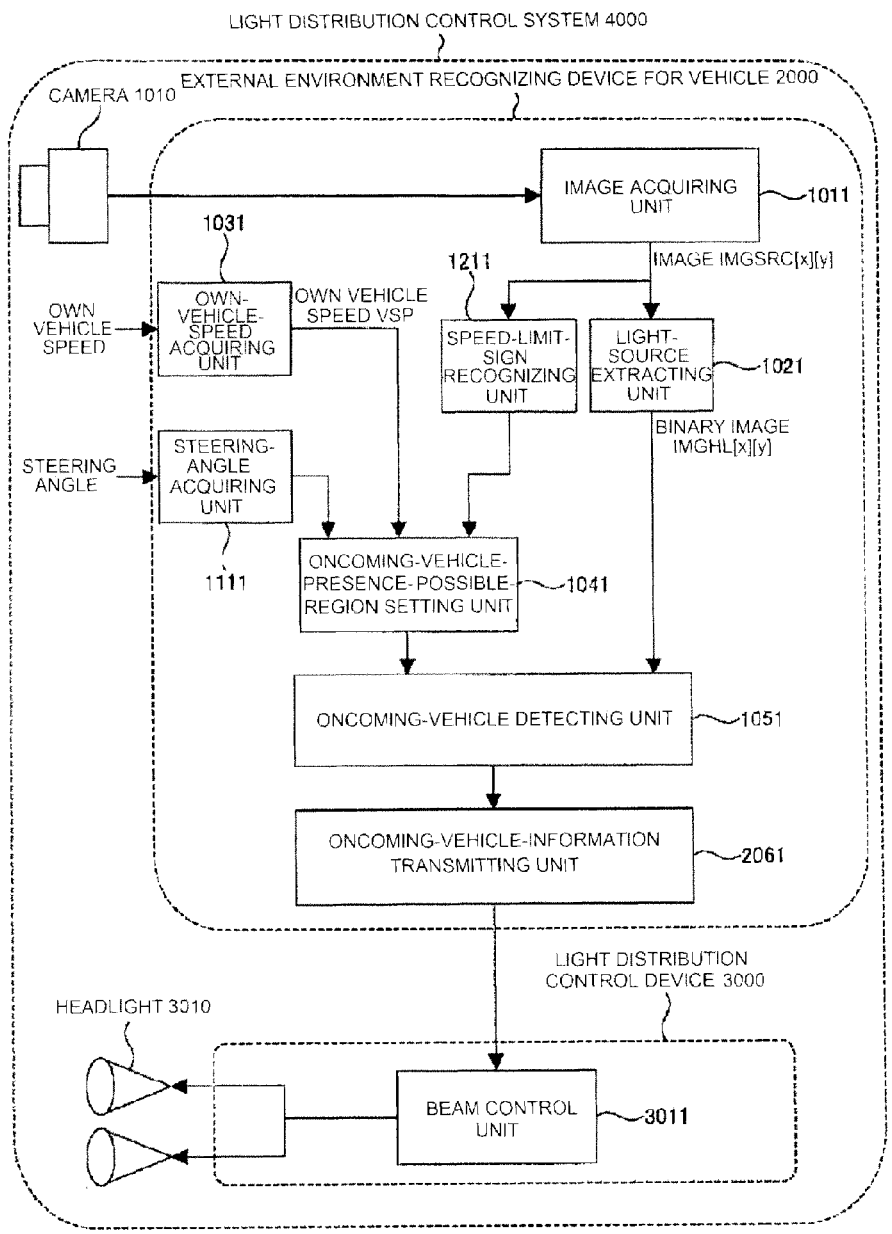
FIG. 9 is a block diagram showing an embodiment of a light distribution control system according to the present invention.

FIG. 9 is a block diagram showing the embodiment of the light distribution control system 4000. In the following explanation, only differences from the external environment recognizing device for vehicle 1000 explained above are explained in detail. Components same as the components of the external environment recognizing device for vehicle 1000 are denoted by the same reference numerals and explanation of the components is omitted.

The light distribution control system 4000 includes, as shown in FIG. 9, the external environment recognizing device for vehicle 2000 and the light distribution control device 3000.

The external environment recognizing device for vehicle 2000 is incorporated, for example, in a camera mounted on an automobile or in an integrated controller and used to detect an object set in advance from an image picked up by the camera 1010. In this embodiment, the external environment recognizing device for vehicle 2000 is configured to detect an oncoming vehicle and a preceding vehicle from an image obtained by picking up an image of an area ahead of the own vehicle.

The external environment recognizing device for vehicle 2000 is configured by a computer including a CPU, a memory, and an I/O. The external environment recognizing device for vehicle 2000 is programmed with predetermined processing to repeatedly execute processing at a period set in advance. The external environment recognizing device for vehicle 2000 includes, as shown in FIG. 9, the image acquiring unit 1011, the light-source extracting unit 1021, the own-vehicle-speed acquiring unit 1031, the oncoming-vehicle-presence-possible-region setting unit 1041, the oncoming-vehicle detecting unit 1051, and an oncoming-vehicle-information transmitting unit 2061. Further, depending on an embodiment, the external environment recognizing device for vehicle 2000 includes the steering-angle acquiring unit 1111 and the speed-limit-sign recognizing unit 1211.

The light distribution control device 3000 is incorporated, for example, in a controller for headlights 3010 mounted on an automobile or in an integrated controller. The headlights 3010 include a beam control unit 3011 configured to switch irradiation intensity of a beam in at least two or more stages.

In this embodiment, a lighting device that can switch the intensity of the headlights 3010 in two stages of a low beam and a high beam is explained.

The oncoming-vehicle-information transmitting unit 2061 transmits information concerning an oncoming vehicle detected by the oncoming-vehicle detecting unit 1051 to the light distribution control device 3000 on the outside of the external environment recognizing device for vehicle 2000. The information concerning the oncoming vehicle to be transmitted includes at least one of a flag fC representing presence or absence of an oncoming vehicle, an angle Cθ[c] with respect to a traveling direction of the own vehicle, a distance CY[c] from the own vehicle front end to the oncoming vehicle front end, and a lateral position CX[c] from the own vehicle center to the oncoming vehicle center. In the information, represents an ID number affixed when a plurality of oncoming vehicles are detected.

These kinds of position information can be calculated by a publicly-known method using a camera geometric parameter if a coordinate of the oncoming vehicle on an image is known. Therefore, detailed explanation of the information is omitted. These kinds of position information of the oncoming vehicle may be directly input from the external environment recognizing device for vehicle 2000 to the light distribution control device 3000 or may be communicated with a radar using a LAN (Local Area Network).

The beam control unit 3011 receives an output of the external environment recognizing device for vehicle 2000 and switches irradiation intensity of the headlights 3010.

The beam control unit 3011 receives information concerning an oncoming vehicle received from the oncoming-vehicle-information transmitting unit 2061 mounted on the external environment recognizing device for vehicle 2000 and information concerning a preceding vehicle detected by a publicly-known method.

As explained above, the information concerning the oncoming vehicle includes at least one of the flag fC representing presence or absence of an oncoming vehicle, the angle Cθ[c] with respect to a traveling direction of the own vehicle, the distance CY[c] from the own vehicle front end to the oncoming vehicle front end, and the lateral position CX[c] from the own vehicle center to the oncoming vehicle center.

The information concerning the preceding vehicle includes at least one of a flag fP representing presence or absence of a preceding vehicle, an angle Pθ[p] with respect to a traveling direction of the own vehicle, a distance PY[p] from the own vehicle front end to the preceding vehicle rear end, and a lateral position PX[p] from the own vehicle center to the preceding vehicle center. In the information, p represents an ID number affixed when a plurality of preceding vehicles are detected.

Types of the information concerning the oncoming vehicle and the information concerning the preceding vehicle to be received are the same. For example, when the flag fC representing presence or absence of an oncoming vehicle is received, the flag fP representing presence or absence of a preceding vehicle is received. When the distance CY[c] and the angle Cθ[c] of the oncoming vehicle are received, the distance PY[p] and the angle Pθ[p] of the preceding vehicle are received.

When the flag fC representing presence or absence of an oncoming vehicle and the flag fP representing presence or absence of a preceding vehicle are received, the high beam is irradiated if no oncoming vehicle and no preceding vehicle are present and the low beam is irradiated to prevent drivers of other vehicles from being dazzled if an oncoming vehicle or a preceding vehicle is present.

When the distance CY[c] to the oncoming vehicle and the distance PY[p] to the preceding vehicle are received, the high beam is irradiated if a distance to closest another car is larger than a predetermined value and the low beam is irradiated if the distance is smaller than the predetermined value.

When the lateral position CX[c] of the oncoming vehicle and the lateral position PX[p] of the preceding vehicle or the angle Cθ[c] of the oncoming vehicle and the angle Pθ[p] of the preceding vehicle are received, the high beam is irradiated if both of the oncoming vehicle and the preceding vehicle are outside an irradiation range and the low beam is irradiated if the oncoming vehicle or the preceding vehicle is present in the irradiation range of the headlights.

For adjustment of the irradiation intensity of the headlights 3010, the intensity of a light source of the headlights may be adjusted or an irradiation angle of the headlights may be switched.

When the irradiation intensity of the headlights 3010 can be switched in multiple stages, the beam intensity may be adjusted according to a shortest distance to the own vehicle of the distance CY[c] to the oncoming vehicle and the distance PY[p] to the preceding vehicle.

As explained above, the light distribution control system 4000 according to this embodiment determines beam intensity using the beam control unit 3011 of the light distribution control device 3000 on the basis of the information concerning the oncoming vehicle detected by the external environment recognizing device for vehicle 2000 and the information concerning the preceding vehicle detected by the publicly-known method and controls the headlights 3010. Consequently, it is possible to prevent dazzling of drivers of other vehicles by irradiating the high beam if an oncoming vehicle and a preceding vehicle are absent and irradiating the low beam if an oncoming vehicle or a preceding vehicle is present. The present invention can prevent, in such a system, switching from the high beam to the low beam even if a reflector or the like is present on the left side of the own vehicle.

For the headlights 3010 in this embodiment, as shown in FIG. 10(a), a lighting device is used that can divide a beam irradiation range of the headlights 3010 in a fan shape and switch irradiation intensity of a beam in two stages of a low beam and a high beam independently in respective regions.

The beam control unit 3011 receives an output of the external environment recognizing device for vehicle 2000 and switches the irradiation intensity of the headlights 3010.

As explained above, the beam control unit 3011 receives information concerning an oncoming vehicle 51 and information concerning a preceding vehicle 52.

The information concerning the oncoming vehicle 51 includes at least one of the angle Cθ[c] with respect to a traveling direction of the own vehicle, the distance CY[c] from the own vehicle front end to the oncoming vehicle front end, and the lateral position CX[c] from the own vehicle center to the oncoming vehicle center.

The information concerning the preceding vehicle 52 includes at least one of the angle Pθ[p] with respect to a traveling direction of the own vehicle, the distance PY[p] from the own vehicle front end to the preceding vehicle rear end, and the lateral position PX[p] from the own vehicle center to the preceding vehicle center.

Types of the information concerning the oncoming vehicle 51 and the information concerning the preceding vehicle 52 to be received are the same. For example, when the distance CY[c] and the angle Cθ[c] of the oncoming vehicle 51 are received, the distance PY[p] and the angle Pθ[p] of the preceding vehicle 52 are received.

When the angle Cθ[c] of the oncoming vehicle 51 and the angle Pθ[p] of the preceding vehicle 52 are received, as shown in FIG. 10(b), among the irradiation regions, the low beam is irradiated in a region where the oncoming vehicle 51 or the preceding vehicle 52 is present and the high beam is irradiated in the other regions.

When the lateral position CX[c] and the distance Cy[c] of the oncoming vehicle 51 and the lateral position PX[p] and the distance PY[p] of the preceding vehicle 52 are received, the low beam is irradiated in the region where the oncoming vehicle 51 or the preceding vehicle 52 is present and the high beam is irradiated in the other regions.

For adjustment of the irradiation intensity of the headlights in the respective regions, the intensity of a light source of the headlights may be adjusted or an irradiation angle of the headlights may be switched. In other words, the beam control unit 3011 controls the irradiation intensity or the irradiation angle of the headlights on the basis of received information concerning an oncoming vehicle and input information concerning a preceding vehicle.

When the irradiation intensity of the headlights 3010 can be switched in multiple states, the beam intensity may be changed according to a distance in the region where the oncoming vehicle 51 or the preceding vehicle 52 is present.

In the following explanation, a vehicle travels in a scene shown in FIG. 11(a) while using the headlights 3010 shown in FIG. 10.

Figure 11:
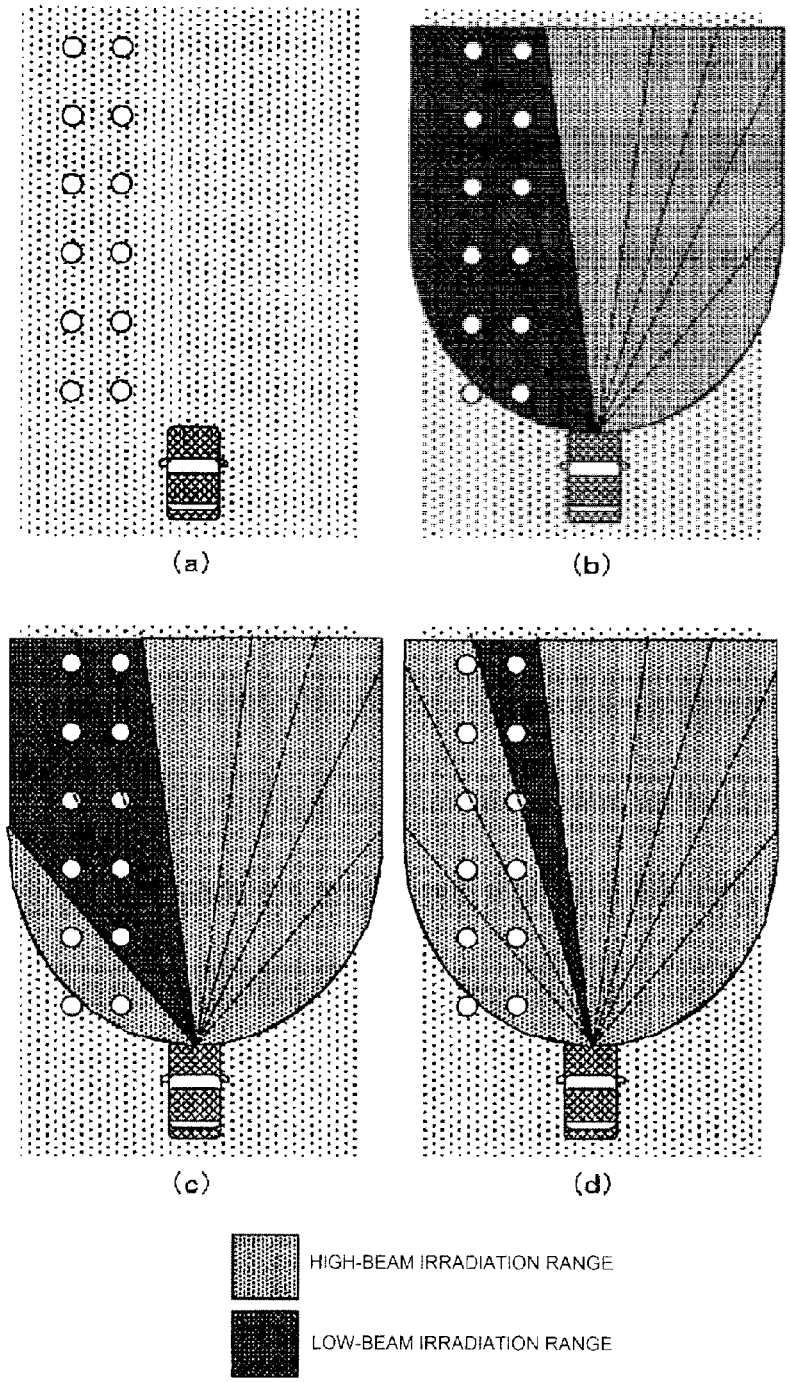
FIG. 11 is a diagram for explaining an effect in the irradiation range of the headlights shown in FIG. 10.

As shown in FIG. 11(a), when objects (reflection plates) glittering in white such as reflectors are present on the left side of the own vehicle on a road without a white line, if the own vehicle travels using the related art, light on the left side of the own vehicle is misdetected as an oncoming vehicle. Therefore, when the headlights 3010 are used, as shown in FIG. 11(b), the low beam is irradiated in a certain portion of the reflectors and the high beam is irradiated in the other portions. In other words, when a white line is not recognized in an image and a reflection plate such as a reflector is recognized on the road surface, the beam control unit 3011 controls the head lights to be the low beams in a region where the reflection plate is present.

Figure 10:
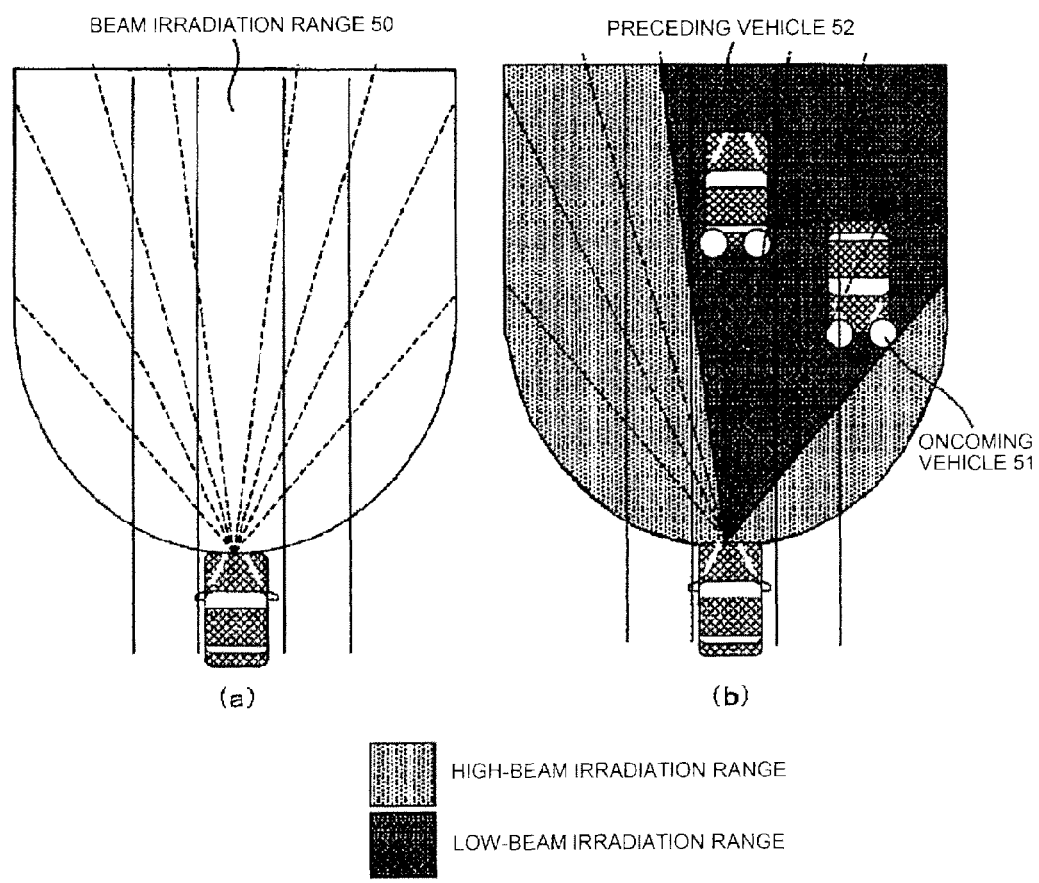
FIG. 10 is a schematic diagram showing an example of an irradiation range of headlights of the external environment recognizing device for vehicle according to the present invention.

On the other hand, when the headlights 3010 shown in FIG. 10 are used, beam irradiation on the reflector region on the left side of the own vehicle can be intensified. The light distribution control system 4000 calculates an oncoming vehicle presence possible region according to own vehicle speed. Therefore, a region in which the high beam is irradiated changes according to a change in the own vehicle speed. In other words, when a white line is not recognized in an image and a reflection plate such as a reflector is recognized on the road surface, the beam control unit 3011 controls an irradiation range of the headlights on the basis of the own vehicle speed.

For example, during low speed traveling, as shown in FIG. 11(c), the high beam is irradiated only in a range on the vehicle side among the reflectors. During high speed traveling, as shown in FIG. 11(d), the high beam is irradiated on even the reflectors in the distance.

In the explanation of this embodiment, the road in Japan is referred to as an example. However, the present invention can also be applied when a road situation in Japan changes and in roads in countries other than Japan using a regulation of a turning radius of a road corresponding to a speed limit and information concerning driving on the right side and driving on the left side of the road.

In this embodiment, the present invention is applied to oncoming vehicle detection based on a visible image picked up by a monocular camera. However, the present invention can also be applied to oncoming vehicle detection based on a stereo camera.

The present invention is not limited to the embodiments explained above. Various modifications are possible without departing from the spirit of the present invention.

REFERENCE SIGNS LIST

1000, 2000 external environment recognizing devices for vehicle
1011 image acquiring unit
1021 light-source extracting unit
1031 own-vehicle-speed acquiring unit
1041 oncoming-vehicle-presence-possible-region setting unit
1051 oncoming-vehicle detecting unit
1111 steering-angle acquiring unit
1211 speed-limit-sign recognizing unit
2061 oncoming-vehicle-information transmitting unit
3000 light distribution control device
3010 headlights
3011 beam control unit
4000 light distribution control system

The invention claimed is:

1. An external environment recognizing device for vehicle comprising:
   an image acquiring unit comprising a camera configured to acquire an image obtained by picking up an image of an area ahead of an own vehicle;
   one or more computers configured with:
      a light-source extracting unit configured to extract a light source from the acquired image to determine a position of the light source;
      an own-vehicle-speed acquiring unit configured to acquire own vehicle speed;
      an oncoming-vehicle-presence-possible-region setting unit configured to estimate an oncoming vehicle presence possible region on the basis of the own vehicle speed; and
      an oncoming-vehicle detecting unit configured to detect an oncoming vehicle on the basis of the oncoming vehicle presence possible region estimated by the oncoming-vehicle-presence-possible-region setting unit and the light source extracted by the light-source extracting unit, wherein
      the oncoming-vehicle-presence-possible-region setting unit is configured to estimate a minimum turning radius of a traveling road on the basis of the own vehicle speed, a minimum curvature radius of the traveling road corresponding to a speed limit determined in advance, and traffic information indicating whether driving on the traveling road is driving on a right side or driving on a left side and estimate the oncoming vehicle presence possible region on the basis of the estimated minimum turning radius such that certain areas are excluded from the presence possible region based upon whether driving on the traveling road is driving on a right side or driving on a left side and which direction the vehicle is turning.

2. The external environment recognizing device for vehicle according to claim 1, wherein, when the driving on the traveling road is the driving on the left side, the oncoming-vehicle-presence-possible-region setting unit is configured to estimate, as the oncoming vehicle presence possible region, a region further on the right side than a circle drawn in a left curve at the minimum turning radius from a right end of the own vehicle.

3. The external environment recognizing device for vehicle according to claim 1, wherein, when the driving on the traveling road is the driving on the right side, the oncoming-vehicle-presence-possible-region setting unit is configured to estimate, as the oncoming vehicle presence possible region, a region further on the left side than a circle drawn in a right curve at the minimum turning radius from a left end of the own vehicle.

4. The external environment recognizing device for vehicle according to claim 1, wherein the oncoming-vehicle-presence-possible-region setting unit is configured to calculate a maximum yaw angle during a lane change of the own vehicle and estimate the oncoming vehicle presence possible region on the basis of the maximum yaw angle and the minimum turning radius.

5. The external environment recognizing device for vehicle according to claim 4, wherein, when the driving on the traveling road is the driving on the left side, the oncoming-vehicle-presence-possible-region setting unit is configured to estimate, as the oncoming vehicle presence possible region, a region further on the right side than a circle drawn in a left curve at the minimum turning radius from a right end of the own vehicle and on the right side of a straight line tilting to the left side by the maximum yaw angle from the right end of the own vehicle.

6. The external environment recognizing device for vehicle according to claim 4, wherein, when the driving on the traveling road is the driving on the right side, the oncoming-vehicle-presence-possible-region setting unit is configured to estimate, as the oncoming vehicle presence possible region, a region further on the left side than a circle drawn in a right curve at the minimum turning radius from a left end of the own vehicle and on the left side of a straight line tilting to the right side by the maximum yaw angle from the left end of the own vehicle.

7. The external environment recognizing device for vehicle according to claim 1, further comprising a steering-angle acquiring unit configured to acquire a steering angle of the own vehicle, wherein
   the oncoming-vehicle-presence-possible-region setting unit is configured to estimate a minimum turning radius of the traveling road on the basis of the own vehicle speed, the steering angle, and the traffic information indicating whether driving on the traveling road is driving on the right side or driving on the left side and estimate the oncoming vehicle presence possible region on the basis of the estimated minimum turning radius.

8. The external environment recognizing device for vehicle according to claim 1, further comprising a speed-limit-sign recognizing unit configured to recognize a sign indicating a speed limit from the image and acquire the speed limit.

9. A light distribution control system comprising:
an external environment recognizing device for vehicle including an image acquiring unit comprising a camera configured to acquire an image obtained by picking up an image of an area ahead of an own vehicle,
one or more computers configured with: a light-source extracting unit configured to extract a light source from the acquired image to determine a position of the light source, an own-vehicle-speed acquiring unit configured to acquire own vehicle speed, an oncoming-vehicle-presence-possible-region setting unit configured to estimate an oncoming vehicle presence possible region on the basis of the own vehicle speed, and an oncoming-vehicle detecting unit configured to detect an oncoming vehicle on the basis of the oncoming vehicle presence possible region estimated by the oncoming-vehicle-presence-possible-region setting unit and the light source extracted by the light-source extracting unit and output information concerning the oncoming vehicle; and
a light distribution control device including a beam control unit configured to control irradiation intensity of a headlight, wherein
the external environment recognizing device for vehicle includes an oncoming-vehicle-information transmitting unit configured to transmit information concerning the oncoming vehicle output from the oncoming-vehicle detecting unit to the light distribution control device, the oncoming-vehicle-presence-possible-region setting unit is configured to estimate a minimum turning radius of a traveling road on the basis of the own vehicle speed, a minimum curvature radius of the traveling road corresponding to a speed limit determined in advance, and traffic information indicating whether driving on the traveling road is driving on a right side or driving on a left side and estimate the oncoming vehicle presence possible region on the basis of the estimated minimum turning radius such that certain areas are excluded from the presence possible region based upon whether driving on the traveling road is driving on a right side or driving on a left side and which direction the vehicle is turning.

10. The light distribution control system according to claim 9, wherein the beam control unit of the light distribution control device controls irradiation intensity and an irradiation angle of the headlight on the basis of the received information concerning the oncoming vehicle and input information concerning a preceding vehicle.

11. The light distribution control system according to claim 9, wherein the information concerning the oncoming vehicle includes at least one of presence or absence of an oncoming vehicle, an angle with respect to a traveling direction of the own vehicle, a distance from an own vehicle front end to an oncoming vehicle front end, and a lateral position from an own vehicle center to an oncoming vehicle center.

12. The light distribution control system according to claim 10, wherein the information concerning the preceding vehicle includes at least one of presence or absence of a preceding vehicle, an angle with respect to a traveling direction of the own vehicle, a distance from an own vehicle front end to a preceding vehicle rear end, and a lateral position from an own vehicle center to a preceding vehicle center.

13. The light distribution control system according to claim 10, wherein, the beam control unit of the light distribution control device controls the headlight to irradiate a high beam if an oncoming vehicle and a preceding vehicle are absent and controls the headlight to irradiate a low beam if an oncoming vehicle or a preceding vehicle is present.

14. The light distribution control system according to claim 10, wherein, when a distance from an own vehicle front end to an oncoming vehicle front end and a distance from the own vehicle front end to a preceding vehicle rear end are received, the beam control unit of the light distribution control device controls the headlight to irradiate a high beam if a distance from the own vehicle to an oncoming vehicle or a preceding vehicle closest to the own vehicle is larger than a value set in advance and controls the headlight to irradiate a low beam if the distance is equal to or smaller than the value set in advance.

15. The light distribution control system according to claim 10, wherein, when an angle with respect to a traveling direction of the own vehicle or a lateral position from an own vehicle center to an oncoming vehicle center and a lateral position from an own vehicle center to a preceding vehicle center are received, the beam control unit of the light distribution control device causes the headlight to irradiate a high beam if the oncoming vehicle and the preceding vehicle are outside an irradiation range of the headlight and causes the headlight to irradiate a low beam if the oncoming vehicle and the preceding vehicle are within the irradiation range of the headlight.

16. The light distribution control system according to claim 10, wherein, even when a preceding vehicle and an oncoming vehicle are absent, a white line is not recognized in the image, and a reflection plate is present on a road surface, the beam control unit of the light distribution control device controls the headlight to irradiate a high beam in a region determined as a region other than the oncoming vehicle presence possible region.

* * * * *